United States Patent
Nakatani

(10) Patent No.: US 12,314,025 B2
(45) Date of Patent: May 27, 2025

(54) CONTROL DEVICE AND CONTROL METHOD

(71) Applicant: OMRON Corporation, Kyoto (JP)

(72) Inventor: Yoshihiro Nakatani, Kyoto (JP)

(73) Assignee: OMRON Corporation, Kyoto (JP)

( * ) Notice: Subject to any disclaimer, the term of this patent is extended or adjusted under 35 U.S.C. 154(b) by 335 days.

(21) Appl. No.: 17/635,370

(22) PCT Filed: Mar. 4, 2020

(86) PCT No.: PCT/JP2020/009061
§ 371 (c)(1),
(2) Date: Feb. 14, 2022

(87) PCT Pub. No.: WO2021/053853
PCT Pub. Date: Mar. 25, 2021

(65) Prior Publication Data
US 2022/0334548 A1    Oct. 20, 2022

(30) Foreign Application Priority Data

Sep. 17, 2019   (JP) ................................ 2019-168578

(51) Int. Cl.
*G05B 19/05*    (2006.01)

(52) U.S. Cl.
CPC .... *G05B 19/058* (2013.01); *G05B 2219/1105* (2013.01); *G05B 2219/15057* (2013.01)

(58) Field of Classification Search
CPC .. G05B 2219/1105; G05B 2219/15057; G05B 19/058
See application file for complete search history.

(56) References Cited

U.S. PATENT DOCUMENTS 7,596,744 B1 *   9/2009   Kow .................... G06F 11/1004
                                                                    714/819
10,303,542 B2 *   5/2019   Suzuki .................... G06F 11/10
(Continued)

FOREIGN PATENT DOCUMENTS

CN    101063948    10/2007
CN    106464012    2/2017
(Continued)

OTHER PUBLICATIONS

"International Search Report (Form PCT/ISA/210) of PCT/JP2020/009061," mailed on Jun. 2, 2020, with English translation thereof, pp. 1-4. Searching Authority (Form PCT/ISA/237) of PCT/with English translation thereof, pp. 1-6.
(Continued)

*Primary Examiner* — Mohammad Ali
*Assistant Examiner* — Vincent W Chang
(74) *Attorney, Agent, or Firm* — JCIPRNET

(57) ABSTRACT

A control device includes an arithmetic processing part, a programmable circuit part, and an abnormality notification part. The programmable circuit part includes a storage part, an abnormality detection part, and an abnormality recording part. The storage part stores a configuration data. The abnormality detection part detects a soft error of the storage part. The abnormality recording part records information of the soft error detected by the abnormality detection part. The abnormality notification part determines whether information of a new soft error is recorded in the abnormality recording part, and when determining that information of a new soft error is recorded, notifies the arithmetic processing part of occurrence of the new soft error.

8 Claims, 5 Drawing Sheets

(56) References Cited

U.S. PATENT DOCUMENTS

| | | | |
|---|---|---|---|
| 2007/0283193 A1* | 12/2007 | Lewis | G06F 11/1064 |
| | | | 714/48 |
| 2014/0095928 A1* | 4/2014 | Ogasawara | G06F 11/142 |
| | | | 714/15 |
| 2017/0139605 A1 | 5/2017 | Shinozaki et al. | |
| 2018/0093538 A1* | 4/2018 | Rothschild | B60T 8/1708 |
| 2018/0224842 A1 | 8/2018 | Ichimura | |
| 2020/0371878 A1* | 11/2020 | Chaiken | G06F 9/4401 |

FOREIGN PATENT DOCUMENTS

| | | |
|---|---|---|
| CN | 108398915 | 8/2018 |
| CN | 109840718 | 6/2019 |
| JP | 2006169661 | 6/2006 |
| JP | 2007293856 | 11/2007 |
| JP | 2017091456 | 5/2017 |
| JP | 2018022277 | 2/2018 |
| JP | 2018128820 | 8/2018 |

OTHER PUBLICATIONS

"Written Opinion of the International JP2020/009061," mailed on Jun. 2, 2020.

"Search Report of Europe Counterpart Application", issued on Sep. 18, 2023, pp. 1-8.

"Office Action of China Counterpart Application", issued on Feb. 29, 2024, with English translation thereof, p. 1-p. 22.

* cited by examiner

CONTROL DEVICE AND CONTROL METHOD

CROSS-REFERENCE TO RELATED APPLICATION

This application is a 371 application of the International PCT application serial no. PCT/JP2020/009061, filed on Mar. 4, 2020, which claims the priority benefits of Japan Patent Application No. 2019-168578, filed on Sep. 17, 2019. The entirety of each of the above-mentioned patent applications is hereby incorporated by reference herein and made a part of this specification.

TECHNICAL FIELD

The present invention relates to a control device and a control method.

RELATED ART

Machines and equipment used at a production site are typically controlled by a control device such as a programmable logical controller (hereinafter also referred to as a PLC). Typically, a user creates a control program executed by the control device using an information processing device. Such a program freely designed and created by the user is also referred to as a user program.

The PLC includes a central processing unit (hereinafter also referred to as a CPU) and a functional unit such as an I/O (input/output) unit. The I/O unit performs signal input from external switches and sensors and signal output to external relays and actuators. The functional unit may be realized by using a programmable circuit such as an FPGA (field-programmable gate array).

The programmable circuit has an advantage that the user can construct a circuit independently. On the other hand, the programmable circuit has a disadvantage that there is a possibility that a soft error may occur; in a soft error, information of a Config RAM (hereafter also referred to as a CRAM) storing a configuration data provided inside the programmable circuit is changed by radiation or the like. Specifically, when an SRAM (static random access memory) is used as the CRAM, a soft error is likely to occur.

In the CRAM, used areas that constitute a functional unit and unused areas that do not constitute the functional unit are mixed, and a soft error may occur in both a used area and an unused area. When a soft error occurs in a used area, there is a possibility that a defect may occur in the control of the control device; in contrast, when a soft error occurs in an unused area, it is unlikely that a defect would occur in the control of the control device. Therefore, in a control device disclosed in Patent Document 1, a position at which a soft error occurs is determined based on map information, and when the position at which a soft error occurs is included in an unused area of a functional part, operation may be continued and unnecessary operation stop can be prevented.

RELATED ART LITERATURE

Patent Literature

[Patent Literature 1] Japanese Patent Application Laid-Open No. 2018-128820

SUMMARY OF INVENTION

Problem to be Solved by Invention

However, in the above conventional art, once a soft error occurs, an interrupt notification is sent to a processor part each time the FPGA part periodically performs error detection. Therefore, it is necessary for the processor part to interrupt normal processing each time to analyze the soft error. In this case, since interrupt processing occurs at a high frequency of once every several milliseconds (ms) to tens of milliseconds, there is a problem that the control cycle in the processor part fluctuates, and high-precision control becomes difficult.

An objective of an embodiment of the present invention is to reduce a load on an arithmetic processing part related to soft error processing in a control device.

Means for Solving Problem

To solve the above problem, a control device according to an aspect of the present invention includes an arithmetic processing part, a programmable circuit part, and an abnormality notification part. The arithmetic processing part is capable of executing a user program. The programmable circuit part is connected to the arithmetic processing part and constitutes a functional part. The programmable circuit part includes a storage part, an abnormality detection part, and an abnormality recording part. The storage part stores a configuration data of the functional part. The abnormality detection part detects a soft error of the storage part. The abnormality recording part records information of the soft error detected by the abnormality detection part. The abnormality notification part determines whether information of a new soft error is recorded in the abnormality recording part, and when determining that information of a new soft error is recorded, notifies the arithmetic processing part of occurrence of the new soft error.

A control method of a control device according to an aspect of the present invention is a control method of a control device including an arithmetic processing part capable of executing a user program and a programmable circuit part connected to the arithmetic processing part and constituting a functional part. The control method includes the following steps. In an abnormality detection step, a soft error of a storage part storing a configuration data of the functional part is detected. In an abnormality recording step, information of the soft error detected in the abnormality detection step is recorded. In an abnormality notification step, it is determined whether information of a new soft error is recorded in the abnormality recording step, and when determining that information of a new soft error is recorded, the arithmetic processing part is notified of occurrence of the new soft error.

Effects of Invention

According to an embodiment of the present invention, it is possible to reduce a load on an arithmetic processing part related to soft error processing in a control device.

DESCRIPTION OF EMBODIMENTS

Hereinafter, an embodiment according to one aspect of the present invention (hereinafter, also referred to as "the present embodiment") will be described with reference to the drawings.

Embodiment 1

§ 1 Application Example

Figure 1:
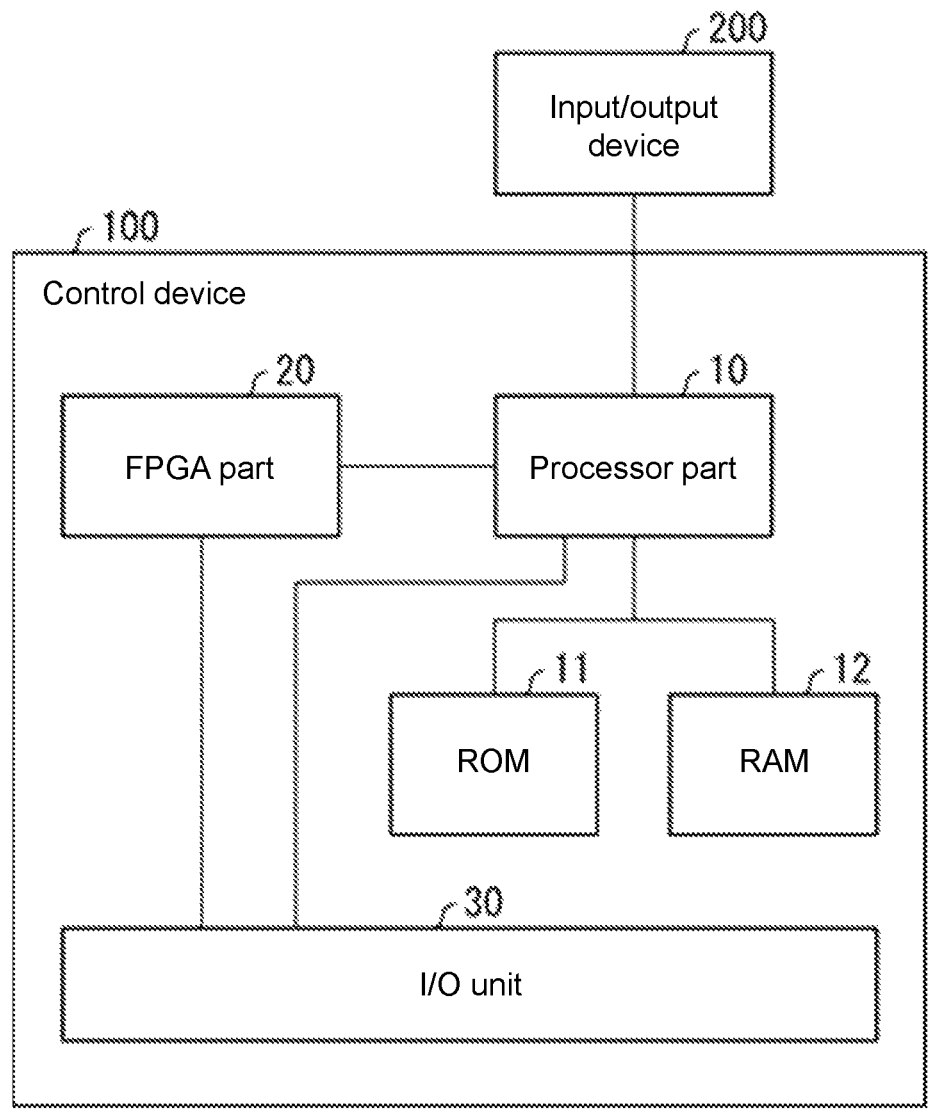
FIG. 1 is a block diagram showing an example of a hardware configuration of a control device according to Embodiment 1 of the present invention.

FIG. 1 is a block diagram showing an example of a hardware configuration of a control device 100 in Embodiment 1. First, an example of a situation in which the present invention is applied will be described with reference to FIG. 1. The control device 100 includes a processor part (arithmetic processing part) 10 and an FPGA part (programmable circuit part) 20. By executing a user program, the processor part 10 mainly performs processing related to control and operation of a control target. The FPGA part 20 constitutes a functional unit (functional part) and executes specific processing on a digital value inputted from the processor part 10.

Figure 2:
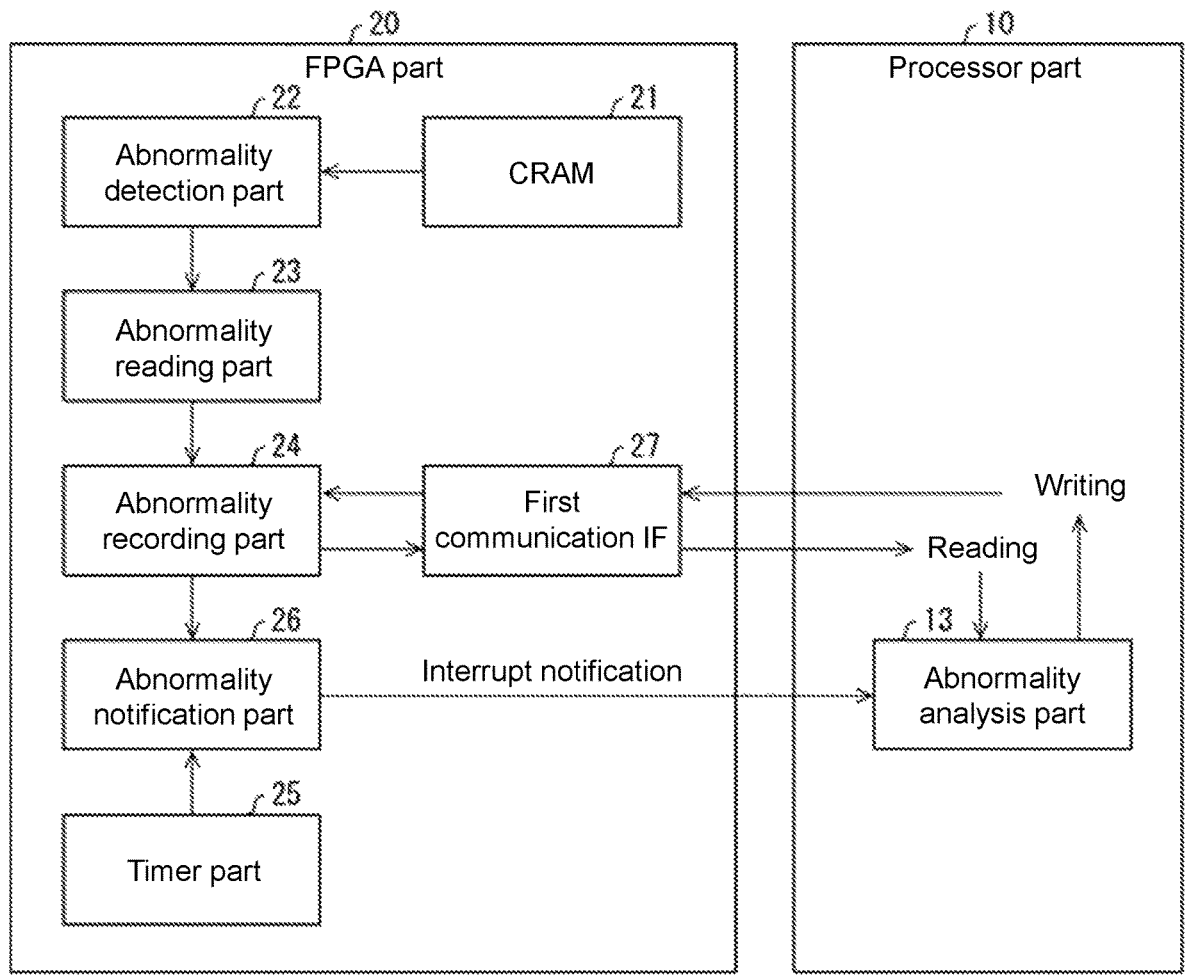
FIG. 2 is a block diagram showing a configuration example of an FPGA part and a processor part in FIG. 1.

FIG. 2 is a block diagram showing a configuration example of the FPGA part 20 and the processor part 10 in FIG. 1. The processor part 10 includes an abnormality analysis part 13. The FPGA part 20 includes a CRAM (storage part) 21, an abnormality detection part 22, an abnormality recording part 24, and an abnormality notification part 26. The CRAM 21 stores a configuration data of the functional part. The abnormality detection part 22 detects a soft error of the CRAM 21. The abnormality recording part 24 records information of soft errors detected by the abnormality detection part 22. The abnormality notification part 26 determines whether information of a new soft error is recorded in the abnormality recording part 24, and when determining that information of a new soft error is recorded, sends an interrupt notification to the processor part 10 to notify occurrence of a new soft error.

According to this embodiment, when the abnormality notification part 26 determines that information of a new soft error is not recorded in the abnormality recording part 24, the process may be ended without performing interrupt notification to the processor part 10. Therefore, it is possible to reduce a frequency of abnormality notification to the processor part 10 and reduce a load on the processor part 10 related to soft error processing.

§ 2 Configuration Example

As shown in FIG. 1, the control device 100 of Embodiment 1 is implemented using a PLC (programmable logic controller) as an example. The control device 100 calculates a command value by executing a program (a system program, a user program, etc.) stored in advance. The control device 100 sends a command value to a control target (e.g., a motor driver or the like) connected via an I/O (input/output) unit 30. Further, the control device 100 acquires a state value from the control target. In other words, by feeding back the state value of the control target, the control device 100 may dynamically generate an appropriate command value and appropriately control the control target according to the situation.

The control device 100 includes a processor part 10, an FPGA part 20, a ROM 11, a RAM 12, and an I/O unit 30. Each component in the control device 100 is connected by a bus. Examples of the bus include a parallel bus and a serial bus such as an I2C and an SPI. The processor part 10 performs sequential processing, and the FPGA part 20 performs parallel processing.

The processor part 10 includes a CPU and executes a program stored in the ROM 11 and the RAM 12 to mainly perform processing related to control and operation of a control target. The FPGA part 20 constitutes a functional unit and executes specific processing on a digital value inputted from the processor part 10. The ROM 11 stores a program for controlling the control device 100 and data necessary for operation of the program. The RAM 12 functions as a work area of the processor part 10. The I/O unit 30 provides an interface with respect to the control target. The input/output device 200 is a device such as a touch panel which presents information to a user and receives an operation input from the user.

To constitute a functional unit which executes specific processing, the FPGA part 20 requires a configuration with a configuration data written into the device. Generally, configuration is performed on the FPGA part 20 immediately after power-on to obtain a functional unit capable of performing a desired circuit operation.

However, in the FPGA part 20, there is a possibility that a soft error in which information of the CRAM storing the configuration data is changed by radiation or the like may occur. Therefore, the FPGA part 20 performs error detection in order to detect a soft error of the CRAM. Hereinafter, the soft error detection of the FPGA part 20 will be described in detail.

As shown in FIG. 2, the processor part 10 includes an abnormality analysis part 13. The FPGA part 20 includes a CRAM 21, an abnormality detection part 22, an abnormality reading part 23, an abnormality recording part 24, a timer part 25, an abnormality notification part 26, and a first communication interface (hereinafter referred to as a communication IF) 27.

At the time of startup, the FPGA part 20 reads a configuration data stored in a ROM (e.g., the ROM 11) outside the FPGA part 20 and stores the configuration data to the CRAM 21 inside the FPGA part 20. The CRAM 21 storing the configuration data is used as a user circuit. Herein, the CRAM 21 is, for example, an SRAM (static random access memory).

The abnormality detection part 22 performs detection of a soft error of the CRAM 21 by using, for example, a CRC (cyclic redundancy check) code. Specifically, the abnormality detection part 22 calculates a CRC value from a value of the data stored in the CRAM 21 and performs a CRC check which compares the calculated CRC value with a CRC value stored in the CRAM 21. If the calculated CRC value is not in line with the stored CRC value, the abnormality detection part 22 detects a soft error of the CRAM 21. The abnormality detection part 22 performs the CRC check sequentially on a plurality of frames included in the FPGA part 20, and when the CRC check of all frames is ended, the CRC check is performed cyclically from the initial frame again.

The abnormality detection part 22 does not perform the CRC check by taking all the frames included in the FPGA part 20 as one unit, but may divide the frames into predetermined blocks and perform the CRC check for each block. For example, the abnormality detection part 22 may divide the FPGA part 20 into four blocks from a block constituting a functional unit A to a block constituting a functional unit D and perform the CRC check for each block.

The abnormality reading part 23 reads information of soft errors detected by the abnormality detection part 22 and writes to the abnormality recording part 24. The abnormality recording part 24 records information of soft errors detected by the abnormality detection part 22. The information of a soft error includes, for example, information on a position (error address) of the soft error and information on a type of the soft error. The type of the soft error includes, for example, a 1-bit error and an adjacent 2-bit error. The abnormality recording part 24 includes one or more log registers and a status register as registers.

The abnormality recording part 24 records information of a firstly detected soft error to a first log register. Then, for a secondly detected soft error and subsequently detected soft errors, if information of the detected soft error is the same as recorded in the first log register, it will not be recorded, and only when it is different, the information of this soft error is recorded to a second log register. Similarly, for subsequently detected soft errors, if information of the detected soft error is the same as recorded in the first log register or the second log register, it will not be recorded, and only when it is different, the information of this soft error is recorded to a third log register.

In the present embodiment, although three log registers in total including the first log register to the third log register are provided, the number of log registers is not limited thereto, and two or less or four or more log registers may be provided. In the present embodiment, when the abnormality detection part 22 detects a fourth soft error, the abnormality recording part 24 may display on the input/output device 200 a warning prompting the user to restart. Since the CRAM 21 is a volatile memory, the soft errors of the CRAM 21 are eliminated when the control device 100 is restarted.

Further, the abnormality recording part 24 may record a status of each soft error recorded in the first log register, the second log register, and the third log register and a detected count of detected soft errors to the status register. In addition, in this specification, the statuses of the soft errors recorded in the first log register, the second log register, and the third log register are respectively referred to as a first status, a second status, and a third status. In an initial state, the first status, the second status, and the third status are set as "unanalyzed".

The timer part 25 notifies the abnormality notification part 26 of start of an interrupt generation process each time a predetermined time elapses. When receiving the notification from the timer part 25, the abnormality notification part 26 determines whether information of a new soft error is recorded in the abnormality recording part 24. According to the notification from the timer part 25, the abnormality notification part 26 may periodically perform the above determination process. Then, when determining that information of a new soft error is recorded, the abnormality notification part 26 sends an interrupt notification to the abnormality analysis part 13 of the processor part 10 to notify occurrence of a new soft error.

The first communication IF 27 is a communication IF in the FPGA part 20 communicating between the abnormality recording part 24 and the abnormality analysis part 13 of the processor part 10.

The processor part 10 includes an abnormality analysis part 13. When being notified by the abnormality notification part 26 of occurrence of a new soft error, the abnormality analysis part 13 analyzes the information of the soft error recorded in the abnormality recording part 24 and writes to the abnormality recording part 24 that the soft error has been analyzed. The abnormality analysis part 13 analyzes, for example, whether a position at which the soft error occurs is included in a used area in which a configuration data for constituting a functional unit is stored, or is included in an unused area in which the configuration data is not stored. Further, when the position of the soft error is included in a used area, the abnormality analysis part 13 may analyze whether it is a soft error handled circuit portion among the used area. As an example, the soft error handled circuit includes a redundant circuit.

§ 3 Operation Example

Figure 3:
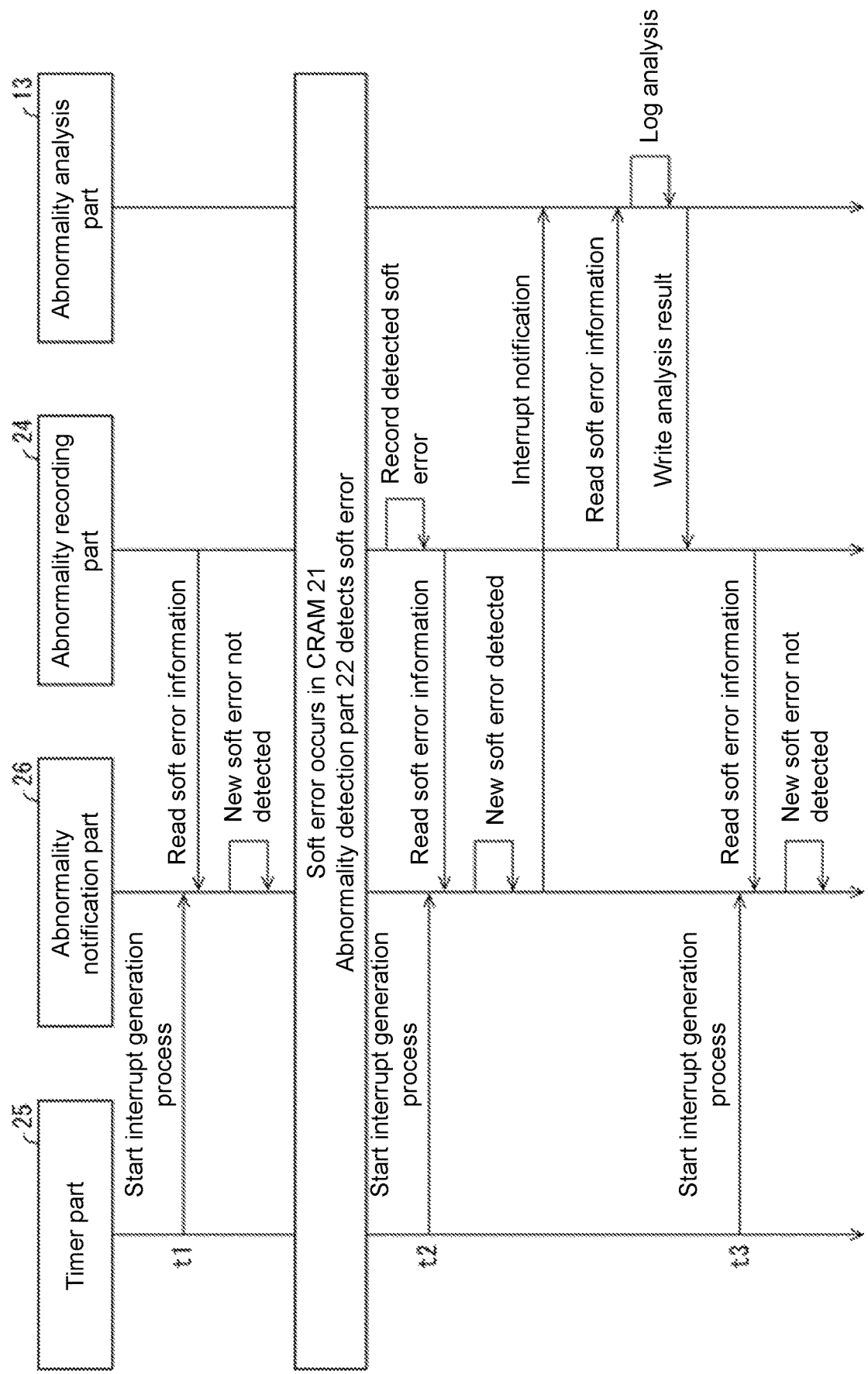
FIG. 3 is a view showing a timing of each step of a control method of the control device according to FIG. 1.

FIG. 3 is a view showing a timing of each step of a control method of the control device 100. The vertical axis shows the time. The example of FIG. 3 shows a case in which a soft error occurs in the CRAM 21 between time t1 and time t2. As shown in FIG. 3, first, at time t1, the timer part 25 notifies the abnormality notification part 26 of start of an interrupt generation process. Receiving the notification from the timer part 25, the abnormality notification part 26 reads information of soft errors from the abnormality recording part 24. At this timing, since no new soft error is detected, the abnormality notification part 26 ends the process directly.

Then, it is assumed that a soft error occurs in the CRAM 21 between time t1 and time t2. The abnormality detection part 22 detects a soft error at a specific time interval. The abnormality reading part 23 reads information of the soft error detected by the abnormality detection part 22 and writes to the abnormality recording part 24. The abnormality recording part 24 records the information of the soft error detected by the abnormality detection part 22 to an empty log register. The abnormality recording part 24 writes a detected count of soft errors (a count of soft errors recorded in the log registers) to the status register.

At time t2 after a predetermined time has elapsed from time t1, the timer part 25 notifies the abnormality notification part 26 of start of an interrupt generation process. Receiving the notification from the timer part 25, the abnormality notification part 26 reads information of soft errors from the abnormality recording part 24. At this timing, since a new soft error is detected, the abnormality notification part 26 sends an interrupt notification to the abnormality analysis part 13 to notify that interrupt processing is required.

Receiving the interrupt notification from the abnormality notification part 26, the abnormality analysis part 13 performs interrupt processing. The abnormality analysis part 13 reads information of the status register and the log registers from the abnormality recording part 24 via the first communication IF 27. The abnormality analysis part 13 analyzes information of a new soft error corresponding to the status of "unanalyzed".

The abnormality analysis part 13 analyzes whether a position of the soft error is included in a used area in which a configuration data of a functional unit is stored, or is included in an unused area in which the configuration data of the functional unit is not stored. The abnormality analysis part 13 obtains "used area" or "unused area" as an analysis result of the position of the soft error.

The abnormality analysis part 13 writes "used area" or "unused area" as a status of the analyzed soft error to the status register of the abnormality recording part 24 via the first communication IF 27. The status of "used area" or "unused area" indicates that the corresponding soft error has been analyzed. Further, the abnormality analysis part 13 continues or stops the operation of the functional unit operating in the FPGA part 20 according to the analysis result.

Then, at time t3 after a predetermined time has elapsed from time t2, the timer part 25 notifies the abnormality notification part 26 of start of an interrupt generation process. Receiving the notification from the timer part 25, the abnormality notification part 26 reads information of soft errors from the abnormality recording part 24. At this timing, since no new soft error is detected, the abnormality notification part 26 ends the process directly.

Figure 4:
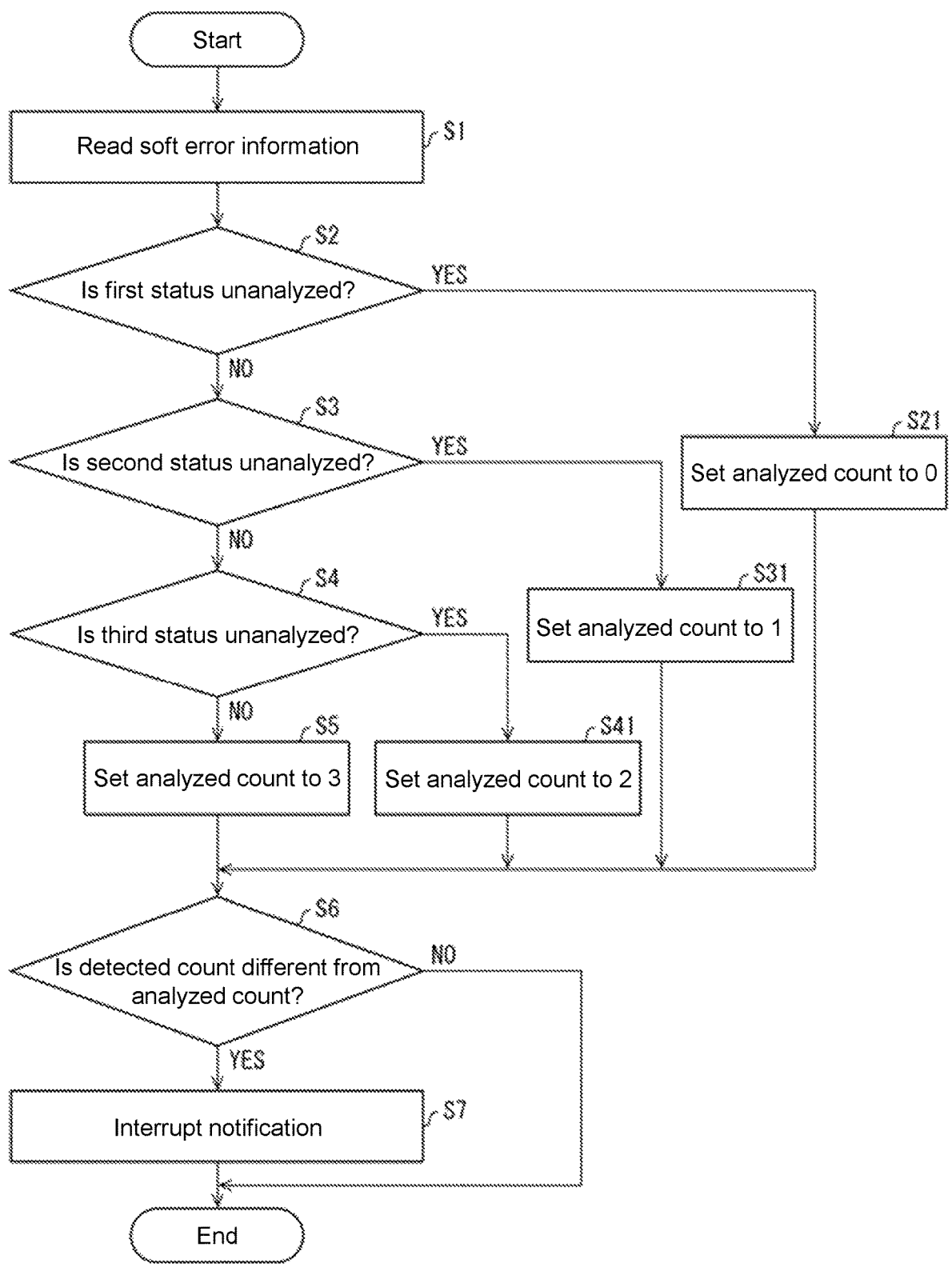
FIG. 4 is a flowchart showing a control method of the control device according to FIG. 1.

FIG. 4 is a flowchart showing a control method of the control device 100. As shown in FIG. 4, when the timer part 25 notifies start of an interrupt generation process, the abnormality notification part 26 reads information of soft errors (a detected count of soft errors and a first status, a second status, and a third status) from the abnormality recording part 24 (step S1).

Next, the abnormality notification part 26 determines whether the first status of the abnormality recording part 24 is unanalyzed (step S2). When the first status is unanalyzed (YES in step S2), proceeding to step S21, the abnormality notification part 26 determines that an analyzed count of soft errors is 0.

When the first status is not unanalyzed (NO in step S2), proceeding to step S3, the abnormality notification part 26 determines whether the second status of the abnormality recording part 24 is unanalyzed. When the second status is unanalyzed (YES in step S3), proceeding to step S31, the abnormality notification part 26 determines that the analyzed count of soft errors is 1.

When the second status is not unanalyzed (NO in step S3), proceeding to step S4, the abnormality notification part 26 determines whether the third status of the abnormality recording part 24 is unanalyzed. When the third status is unanalyzed (YES in step S4), proceeding to step S41, the abnormality notification part 26 determines that the analyzed count of soft errors is 2.

When the third status is not unanalyzed (NO in step S4), proceeding to step S5, the abnormality notification part 26 determines that the analyzed count of soft errors is 3. After step S21, S31, S41, or S5 is ended, proceeding to step S6, the abnormality notification part 26 determines whether the analyzed count of soft errors is different from a detected count of soft errors.

When the detected count of soft errors is different from the analyzed count of soft errors (YES in step S6), the abnormality notification part 26 determines that information of a new soft error is recorded in the log register of the abnormality recording part 24. Then, the abnormality notification part 26 sends an interrupt notification to the abnormality analysis part 13 to notify that interrupt processing is required (step S7). After step S7, the process is ended. In the case of NO in step S6, the abnormality notification part 26 ends the process without performing interrupt notification to the abnormality analysis part 13 of the processor part 10.

Action and Effect

As described above, according to the above configuration, when determining that information of a new soft error is recorded in the abnormality recording part 24, the abnormality notification part 26 notifies the processor part 10 of occurrence of the new soft error. Therefore, it is possible to reduce a frequency of abnormality notification to the processor part 10 and reduce a load on the processor part 10 related to soft error processing.

Further, the abnormality analysis part 13 analyzes information of soft errors recorded in the abnormality recording part 24 and writes an analysis result to the abnormality recording part 24. Therefore, the abnormality notification part 26 can reliably determine whether information of a new soft error is recorded in the abnormality recording part 24.

Further, the abnormality analysis part 13 analyzes whether a position at which a soft error occurs is included in a used area in which a configuration data of a functional part is stored, or is included in an unused area in which the configuration data is not stored. Therefore, when the position at which the soft error occurs is included in an unused area of the functional part, since the operation can be continued, unnecessary operation stop can be prevented.

Further, the processor part 10 performs sequential processing, and the FPGA part 20 performs parallel processing. Therefore, since the FPGA part 20 capable of parallel processing detects soft errors and records information of soft errors, these processes are unlikely to interfere with the progress of other processing.

On the other hand, since the processor part 10 performs sequential processing, when being notified of occurrence of a soft error, it may be necessary to interrupt other processing. However, since the abnormality notification part 26 notifies the processor part 10 of occurrence of a new soft error when determining that information of a new soft error is recorded in the abnormality recording part 24, the frequency of notifying the arithmetic processing part of occurrence of a soft error is low. Therefore, even if the processor part 10 performs sequential processing, the frequency of interrupting other processing can be reduced.

Further, the abnormality notification part 26 receives a notification from the timer part 25 and periodically performs a process of determining whether information of a new soft error is recorded in the abnormality recording part 24. Therefore, the abnormality notification part 26 can perform a determination process of whether information of a new soft error is recorded without receiving a notification from the abnormality detection part 22. Therefore, for example, the control device 100 may be realized by using an existing FPGA without changing the processing of the abnormality detection part 22.

Further, since the FPGA part 20 includes the abnormality notification part 26, it is not necessary to provide another chip such as an ASIC for providing the abnormality notification part 26. Therefore, the configuration of the control device 100 can be simplified.

Embodiment 2

Another embodiment of the present invention will be described below. For convenience of illustration, the same reference numerals will be assigned to members having the same functions as the members described in the above embodiment, and descriptions thereof will not be repeated.

Figure 5:
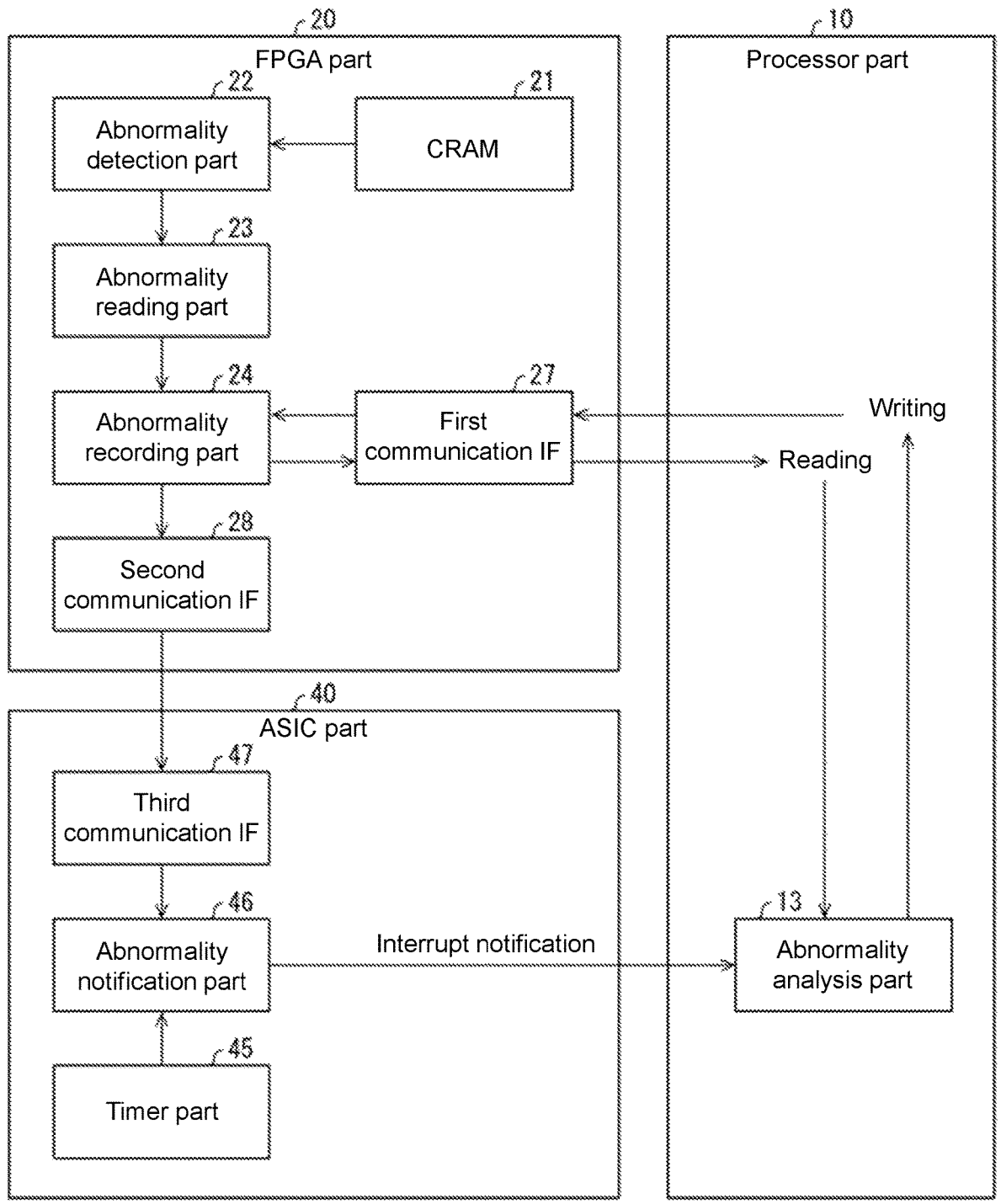
FIG. 5 is a block diagram showing a configuration example of the FPGA part and the processor part in the control device according to Embodiment 2 of the present invention.

FIG. 5 is a block diagram showing a configuration example of the FPGA part 20 and the processor part 10 in the control device 100 according to Embodiment 2. Embodiment 2 is different from Embodiment 1 in that the control device 100 further includes an ASIC part 40, and the ASIC part 40 includes a timer part 45 and an abnormality notification part 46.

Specifically, the FPGA part 20 includes a CRAM 21, an abnormality detection part 22, an abnormality reading part 23, an abnormality recording part 24, a first communication IF 27, and a second communication IF 28. The second communication IF 28 is a communication IF in the FPGA part 20 communicating with the ASIC part 40.

The ASIC part 40 includes a timer part 45, an abnormality notification part 46, and a third communication IF 47. The timer part 45 and the abnormality notification part 46 of the ASIC part 40 respectively have the same functions as the timer part 25 and the abnormality notification part 26 of the FPGA part 20 described in Embodiment 1. The third communication IF 47 is a communication IF in the ASIC part 40 communicating with the FPGA part 20.

As described above, the timer part 45 and the abnormality notification part 46 may be formed in a circuit different from the FPGA part 20 including the CRAM 21.

§ 4 Modification Example

Although the embodiments of the present invention have been described in detail above, the above description is merely an example of the present invention in all respects. Of course, various improvements and modifications may be made without departing from the scope of the present invention. For example, the following changes may be made.

In Embodiment 2, although the abnormality notification part 46 is provided in the ASIC part 40, it may also be provided in an FPGA part different from the FPGA part 20, or may be provided in a processor part different from the processor part 10.

The abnormality analysis part 13 may write a count of analyzed soft errors (a count of soft errors whose status is not "unanalyzed") to the status register of the abnormality recording part 24 via the first communication IF 27. The abnormality notification part 26 may read the count of analyzed soft errors from the status register.

The abnormality recording part 24 does not have to record a detected count of soft errors to the status register. The abnormality notification part 26 may specify the detected count of soft errors based on a count of log registers in which soft errors are recorded.

SUMMARY

A control device according to an aspect of the present invention includes an arithmetic processing part, a programmable circuit part, and an abnormality notification part. The arithmetic processing part is capable of executing a user program. The programmable circuit part is connected to the arithmetic processing part and constitutes a functional part. The programmable circuit part includes a storage part, an abnormality detection part, and an abnormality recording part. The storage part stores a configuration data of the functional part. The abnormality detection part detects a soft error of the storage part. The abnormality recording part records information of the soft error detected by the abnormality detection part. The abnormality notification part determines whether information of a new soft error is recorded in the abnormality recording part, and when determining that information of a new soft error is recorded, notifies the arithmetic processing part of occurrence of the new soft error.

According to the above configuration, since the abnormality notification part notifies the arithmetic processing part of occurrence of a new soft error when determining that information of a new soft error is recorded in the abnormality recording part, a frequency of abnormality notification to the arithmetic processing part can be reduced. Therefore, it is possible to reduce a load on the arithmetic processing part related to soft error processing.

In the control device according to the above aspect, the arithmetic processing part may include an abnormality analysis part, and when being notified by the abnormality notification part of occurrence of the new soft error, the abnormality analysis part may analyze information of the soft error recorded in the abnormality recording part and write to the abnormality recording part that the soft error has been analyzed. According to the above configuration, the abnormality notification part can reliably determine whether information of a new soft error is recorded in the abnormality recording part.

In the control device according to the above aspect, the abnormality analysis part may analyze whether a position at which the soft error occurs is included in a used area in which the configuration data of the functional part is stored, or is included in an unused area in which the configuration data is not stored. According to the above configuration, when the position at which the soft error occurs is included in an unused area of the functional part, since the operation can be continued, unnecessary operation stop can be prevented.

In the control device according to the above aspect, the arithmetic processing part may perform sequential processing, and the programmable circuit part may perform parallel processing. According to the above configuration, since the programmable circuit part capable of parallel processing detects soft errors and records information of soft errors, these processes are unlikely to interfere with the progress of other processing.

On the other hand, since the arithmetic processing part performs sequential processing, when being notified of occurrence of a soft error, it may be necessary to interrupt other processing. However, since the abnormality notification part notifies the arithmetic processing part of occurrence of a new soft error when determining that information of a new soft error is recorded in the abnormality recording part, a frequency of notifying the arithmetic processing part of occurrence of a soft error is low. Therefore, even if the arithmetic processing part performs sequential processing, the frequency of interrupting other processing can be reduced.

In the control device according to the above aspect, the abnormality notification part may periodically perform a process of determining whether information of a new soft error is recorded in the abnormality recording part. According to the above configuration, the abnormality notification part can perform a determination process of whether information of a new soft error is recorded without receiving a notification from the abnormality detection part. Therefore, for example, the control device may be realized by using a commercially available FPGA without changing the processing of the abnormality detection part.

In the control device according to the above aspect, the programmable circuit part may include the abnormality notification part. According to the above configuration, since it is not necessary to provide another chip such as an ASIC (application specific integrated circuit) for providing the abnormality notification part, the configuration of the control device can be simplified.

A control method of a control device according to an aspect of the present invention is a control method of a control device including an arithmetic processing part capable of executing a user program and a programmable circuit part connected to the arithmetic processing part and constituting a functional part. The control method includes the following steps. In an abnormality detection step, a soft error of a storage part storing a configuration data of the functional part is detected. In an abnormality recording step, information of the soft error detected in the abnormality detection step is recorded. In an abnormality notification step, it is determined whether information of a new soft error is recorded in the abnormality recording step, and when determining that information of a new soft error is recorded, the arithmetic processing part is notified of occurrence of the new soft error.

The control device according to each aspect of the present invention may be realized by a computer, and in that case, a control program of a control device which realizes the control device by a computer by operating the computer as each part (software element) included in the control device, and a computer-readable recording medium on which the control program is recorded also fall within the scope of the present invention.

The present invention is not limited to the above-described embodiments, and various modifications may be made within the scope of the claims. The technical scope of the present invention also includes embodiments obtained by appropriately combining the technical means disclosed in the different embodiments.

What is claimed is:

1. A control device comprising:
   a processor, comprising an abnormality analysis part, and configured to execute a user program; and
   a programmable circuit which is connected to the processor and constitutes a functional part;
   wherein the programmable circuit comprises:
      an abnormality notification part;
      a memory configured to store a configuration data of the functional part;
      an abnormality detection part configured to detect a soft error of the memory; and
      an abnormality recording part configured to record a soft error information corresponding to the soft error detected by the abnormality detection part, and
   the abnormality notification part is configured to
      determine whether a new soft error information corresponding to a new soft error being detected by the abnormality detection part is recorded in the abnormality recording part based on the soft error information including a status of the soft error, wherein the status indicates that the soft error has been analyzed, and when a detected count of soft errors is different from an analyzed count of soft errors, the abnormality notification part determines that the new soft error information is recorded in the abnormality recording part, and
      when determining that the new soft error information is recorded, notify the processor of occurrence of the new soft error,
   wherein the detected count is obtained by detecting the soft error of the memory via the abnormality detection part, and the analyzed count is obtained by analyzing whether a position at which the soft error occurs is included in a used area in which the configuration data of the functional part is stored, or is included in an unused area in which the configuration data is not stored via the abnormality analysis part.

2. The control device according to claim 1, wherein when being notified by the abnormality notification part of occurrence of the new soft error, the abnormality analysis part analyzes the soft error information recorded in the abnormality recording part and writes to the abnormality recording part that the soft error has been analyzed.

3. The control device according to claim 2, wherein the processor performs sequential processing, and the programmable circuit performs parallel processing.

4. The control device according to claim 2, wherein the abnormality notification part periodically performs a process of determining whether the new soft error information is recorded in the abnormality recording part.

5. The control device according to claim 1, wherein the processor performs sequential processing, and the programmable circuit performs parallel processing.

6. The control device according to claim 5, wherein the abnormality notification part periodically performs a process of determining whether—the new soft error information is recorded in the abnormality recording part.

7. The control device according to claim 1, wherein the abnormality notification part periodically performs a process of determining whether the new soft error information is recorded in the abnormality recording part.

8. A control method of a control device, which is a control method of a control device comprising a processor capable of executing a user program and a programmable circuit connected to the processor and constituting a functional part, the control method comprising:
   an abnormality detection step of detecting a soft error of a memory storing a configuration data of the functional part;
   an abnormality recording step of recording a soft error information corresponding to the soft error detected in the abnormality detection step; and
   an abnormality notification step of determining whether a new soft error information corresponding to a new soft error being newly detected is recorded in the abnormality recording step based on the soft error information including a status of the soft error, wherein the status indicates that the soft error has been analyzed, and when a detected count of soft errors is different from an analyzed count of soft errors, determining that the new soft error information is recorded, and when determining that the new soft error information is recorded, notifying the processor of occurrence of the new soft error,
   wherein the detected count is obtained by detecting the soft error of the memory, and the analyzed count is obtained by analyzing whether a position at which the soft error occurs is included in a used area in which the configuration data of the functional part is stored, or is included in an unused area in which the configuration data is not stored.

* * * * *